Oct. 6, 1959  T. S. MERTES  2,907,800
PEBBLE CIRCULATING REACTION SYSTEM
Filed Jan. 21, 1958
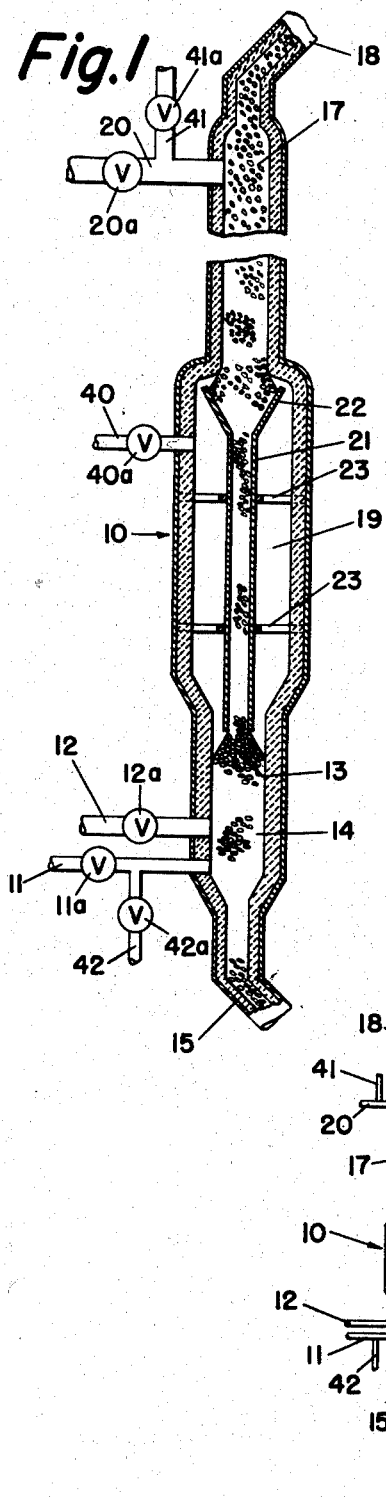
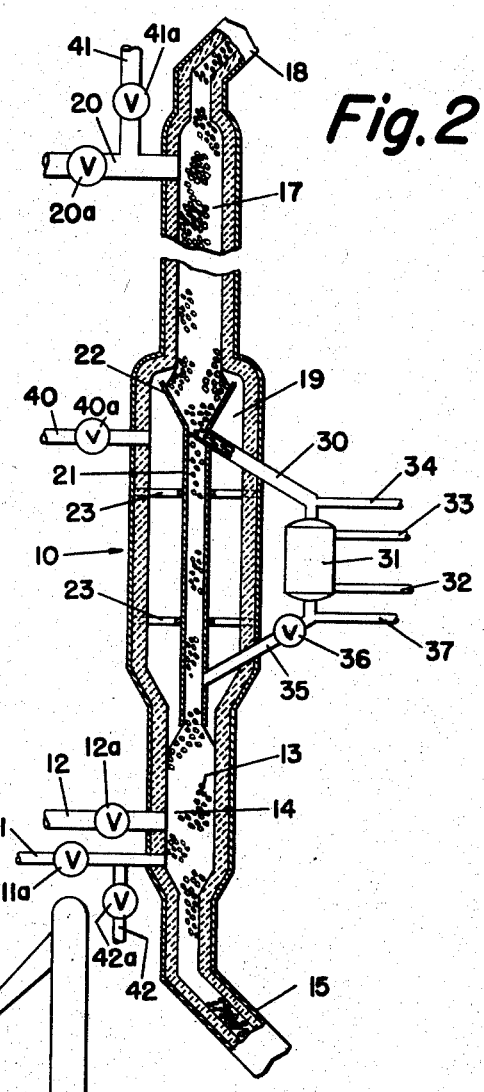
INVENTOR.
THOMAS S. MERTES
BY Robert O. Spindle
ATTORNEY

United States Patent Office 2,907,800
Patented Oct. 6, 1959

2,907,800

PEBBLE CIRCULATING REACTION SYSTEM

Thomas S. Mertes, Wilmington, Del., assignor to Sun Oil Company, Philadelphia, Pa., a corporation of New Jersey Application January 21, 1958, Serial No. 710,383

4 Claims. (Cl. 260—672)

This invention relates to a process for conducting exothermic reactions at high temperatures, and more particularly to a method of carrying out noncatalytic exothermic reactions in vapor phase.

In conventional processes involving noncatalytic exothermic reactions in the vapor phase, such as, for example, the dealkylation of alkyl aromatics, it has been customary to pass the reactants through a furnace to heat them to a temperature at which the reaction will initiate, thence through a reaction chamber in which the desired reaction takes place, and thence to a quench chamber, in which the temperature of the gases is rapidly reduced to avoid side reactions, with consequent loss of desired products, or thermal reaction of the products with the piping.

For example, it has been proposed to thermally demethylate toluene to benzene in the presence of hydrogen, by a process in which the toluene-hydrogen feed at hydrogen-toluene ratios of 0.5:1 to 10:1 is passed through a tube furnace in which it is heated to a temperature in the order of 1000° F. to 1300° F., and at pressures of atmospheric to 250 p.s.i.g. or over, and is then passed to a reaction vessel, commonly termed a soaking drum, in which the hydrogen reacts with the toluene to form benzene and methane, with the liberation of heat which raises the temperature in the reaction vessel to from about 1200° to about 1500° F. A similar process has been proposed for the dealkylation of methyl naphthalene to naphthalene.

In such a process, it is necessary to obtain a yield of the desired aromatic per pass which will not impose an undue load on the process, in recovering the alkylated aromatic for recycle. For example, if only 10% of the feed is converted per pass, nine volumes of alkylated aromatic must be vaporized and recycled per volume of product. If conversion per pass is 33⅓ percent, only two volumes of alkylated aromatic need be vaporized and recycled per net volume of product, and at 50 percent conversion, only one volume of alkylated aromatic need be recycled per volume of product. Obviously, at conversions less than 30% or so, the heat load on the process will be so great as to render the process economically unattractive, and the greater the conversion above this amount the more attractive the process will be from an economic standpoint, insofar as the vaporization cost is concerned.

The desired degree of conversion may be obtained in two ways, first, by raising the preheat and reaction temperatures to the upper limits specified above, at which temperatures the reaction will proceed with sufficient rapidity to permit the use of a relatively small and inexpensive reactor, or second, to operate at less severe process conditions, in which case the reactor must be increased to a size which will permit the reagents to reside therein for a sufficient period of time to allow the reaction to go to the desired degree of completion.

The first method of increasing conversion per pass, i.e., raising the temperatures to the upper limits is undesirable not only because of the high cost of fuel required to raise the feed to a high preheat, but also, and chiefly, because the tubes in the furnace in which the hydrocarbon and hydrogen feed is heated must be constructed of special materials highly resistant to heat and pressure, such as special grades of stainless steel, which, of course, add greatly to the cost of such a furnace. Moreover, even the best of such special materials are rapidly attacked by the feed under such high temperature conditions, with graphitization, carbiding, and the formation of hydrogen bubbles taking place, necessitating frequent shutdowns for maintenance and replacement of tubes.

When the preheat temperature is dropped to a level at which reasonably long life of the furnace tubes may be expected, the dealkylation reaction is much slower, and it is therefore necessary to provide a much larger reactor. The reaction speed falls off very sharply with decreasing temperatures, for example, if the preheat is dropped from 1200° F. to 1150° F., it is necessary to more than double the size of the reactor to obtain the same degree of conversion per pass, while if the temperature is dropped to 1050° F., a reactor twenty-five times as large is required. Obviously, if the preheat temperature is reduced to a point at which the furnace tubing will not be subject to attack, the furnace must be made so large as to be economically impractical.

A further disadvantage is that, while the reactor may be lined with suitable refractory material so that its walls are not subject to attack by the high temperatures used in the process, the off-take piping cannot be so protected, and it is necessary to quench the effluent vapors upon exit from the reactor, customarily with water, in order to reduce their temperature to a point at which standard materials of construction, such as steel, may be safely used. The heat thus extracted from the vapors cannot be returned to the process, and is lost.

It will thus be seen that the process can be operated at low conversions per pass, which imposes the penalty of a heavy load thrown on the fractionating equipment; at high preheat temperatures with the desired conversion, which is uneconomical because of the high cost of construction and maintenance of the furnace; or at lower preheat but long residence time of the reactants in the reactor, which is impractical because of the very large size of the reactor needed. In addition, no matter how the process is operated, the heat content of the reactor effluent is for the most part irretrievably lost. It is therefore desirable to provide a process in which a high degree of preheat can be imparted to the feed without exposing it to materials subject to attack, so that a moderate size reactor may be used to obtain a high conversion per pass, thus avoiding an overload on the fractionating equipment. It would also be desirable to provide a process in which the heat of the reactor effluent is recouped and utilized to preheat the feed to reaction temperature, with concomitant reductions of the temperature to a point at which steel off-take piping may be used. Such a process, as will hereinafter be pointed out, is provided by the present invention.

It is an object of this invention to provide a process for conducting dealkylation reactions in which the need for providing a liquid quench to cool the outlet vapors from the reactor is eliminated.

It is a further object of this invention to eliminate the necessity for any external preheat in such exothermic reactions, other than that necessary to vaporize the reactants at the reaction pressure.

Other objects and advantages of the invention will become apparent as the disclosure proceeds.

Broadly speaking, my invention relates to a process for effecting dealkylation reactions which comprises passing an alkylated aromatic in vapor phase together with hydrogen to the lower portion of a preheat zone which contains a bed of heated particulate refractory solids. The reactants are flowed upwardly through this bed, cooling the solids in the lower portion thereof, while the reactants are in turn heated to reaction temperature as they near the upper portion of the bed. Cooled solids are continuously removed from the lower portion of the bed, while hot solids are continuously added to the top of the bed to maintain the heating capacity of the bed constant while the process is on stream.

After leaving the preheat zone, the reactants, now at reaction temperature, are conducted to a reaction zone where they are held until the required degree of conversion has been attained. It is preferred to carry the reaction to partial completion only, not only to hold the reactor to moderate size, but to maintain the partial pressure of dealkylated aromatic in the mixture to a fairly low level, to minimize the formation of condensation products. For this reason it is preferable to withdraw the mixture of unreacted hydrocarbon and products when, for example, from about 30% to about 70% of the alkyl aromatic in the feed has been alkylated.

From the reaction zone the products are conducted directly to the lower portion of a cooling zone which contains a bed of relatively cool particulate refractory solids. The products flow upwardly through this bed, and are rapidly cooled thereby to below reaction temperature, whereby to inhibit undesired thermal side reactions. A relatively cool product stream is withdrawn from the upper portion of the bed for further processing. Solids which have been heated by the product stream to a temperature approaching that at which the stream left the reaction zone are continuously withdrawn from the bottom of the cooling zone bed and are passed to the top of the bed in the preheat zone to furnish heat for the feed, while the relatively cool solids withdrawn from the bottom of the preheat bed are passed to the top of the cooling zone bed to maintain the heat absorptive capacity of the latter bed constant. It will thus be apparent that a method is provided whereby the product gases are quickly cooled to a temperature below that at which product decomposition or other side reactions take place, and that the heat released by the reaction is effectively conserved and returned to the process to heat the incoming feed to reaction temperatures.

While it is within the scope of my invention to house the preheat zone, reaction zone, and cooling zone in separate vessels, appropriately connected by gas and solid transfer means, I prefer to house all three zones in a single vertical vessel, the preheat zone being at the bottom of the vessel, the reaction zone intermediate thereof, and the cooling zone at the top. In this manner lines carrying highly heated gases may be eliminated, and hot solids may be gravitationally transported from the cooling zone to the preheat zone through a standpipe, eliminating the cost of solid transfer means formed of special heat resistant materials.

In order that those skilled in the art may now fully appreciate the nature of my invention and the means for carrying it out, it will be more fully described in connection with the accompanying drawings in which:

Fig. 1 is a vertical cross-sectional view, partly broken away, of a reactor adapted for use in practicing the present invention, Fig. 2 is a vertical cross-sectional view of a reactor also adapted for use in practicing the present invention, but of somewhat different design, and Fig. 3 is a schematic elevation of the apparatus of which the reactor of Fig. 1 is a part.

Referring now to Figs. 1 and 3, the feed is introduced into the reactor 10 near the base thereof through feed pipes 11 and 12 under the control of valves 11a and 12a, respectively. Reactor 10 is lined with suitable refractory material to minimize heat loss through the walls thereof, and to maintain the reactor shell out of contact with the reacting gases. Preferably cold hydrogen is fed to the reactor through lower feed pipe 11, while the alkyl aromatic is vaporized and fed to the reactor through upper feed pipe 12.

As the feed components enter the reactor 10 they will come into contact with a bed of hot pebbles 13 contained within a heating zone 14 within reactor 10. The feed will rise upwardly through pebbles 13 and will be heated to a temperature at which reaction will take place. Pebbles which have been cooled by contact with the incoming feed are continuously removed from the reactor 10 via pebble outlet line 15, and are transported by pebble elevator 16 to a cooling zone 17 at the top of reactor 10 via pebble inlet 18, while pebbles, which are heated as hereinafter described, are continuously transported from the bottom of cooling zone 17, and are added to the top of heating zone 14 to supply the heat required to raise the feed to reaction temperature. It will be noted that, by supplying the cold hydrogen to the reactor 10 through lower feed pipe 11, the pebbles leaving the heating zone can be cooled to a lower temperature than would be possible if both feed components were fed in at the same level.

Reaction will be initiated near the top of the heating zone 14, and the feed is then disengaged from pebbles 13 and passed upwardly through reaction zone 19, in which the reaction is completed. The heat of reaction will raise the temperature of the gases appreciably above the temperature at which they left the top of the pebble bed in heating zone 14. These hot gases are then passed upwardly through a bed of pebbles in cooling zone 17, in which the product gases are cooled, by contact with the pebbles, to a temperature at which they can be safely taken off through outlet line 20 for further processing. Simultaneously, the pebbles in the lower portion of cooling zone 17 will be heated by the product gases, and these heated pebbles are passed through standpipe 21 to the top of the heating zone 14, where they give up their heat to the incoming feed to raise it to reaction temperature. As may be seen in the drawing, standpipe 21 has a flared upper section 22, which catches pebbles descending from cooling zone 17. The product gases flow through a space between the edge of section 22 and the wall of reactor 10 into cooling zone 17. Since standpipe 21 passes down through reaction zone 19, the pebbles contained therein will not be cooled to any appreciable extent during travel from the lower portion of cooling zone 17 to the upper portion of heating zone 14. Standpipe 21 is supported within reaction zone 19 by any appropriate means, such as by spiders 23.

Since in processes conducted in accordance with the present invention, time of contact of hot gases with the pebbles is minimized due to the provision of the empty reaction zone, in most instances very little deposition of coke or other decomposition products will take place, and ordinarily it is not necessary to remove what products are deposited, since they also can serve as a heat transfer medium. Any fly coke which may break off the pebbles will be carried through the reactor, and will be recovered with still bottoms during subsequent processing of the reaction products. However, in some instances, it may be necessary to remove coke from the pebbles, and in such cases the reactor illustrated in Fig. 2 is preferred. This reactor is identical with the reactor illustrated in Fig. 1, except that a bleed line 30 adapted to remove a portion of the pebbles flowing through standpipe 21, leads from the latter at a point near the top thereof to a regenerator 31. Air or other oxygen containing gas is admitted to regenerator 31 through line 32, and combustion products are withdrawn through line 33. Steam is admitted to line 30 through line 34 to seal the escape of any combustion products, which may contain dangerous quantities of oxygen, from regenerator 31 to the interior of reactor 10. Pebbles from which coke has been burned are returned to the lower end of standpipe 21 via return line 35. Means 36 for controlling the flow of pebbles through line 30, regenerator 31, and line 35, which means may be a valve or other flow-controlling device is interposed in line 35. A sealing gas such as flue gas or steam is admitted to return line 35 through line 37 in order to prevent the passage of process reactants to regenerator 31.

In order that those skilled in the art may appreciate the nature of my invention as applied to specific processes, the following example is given.

This example illustrates the use of my invention as applied to a process for the thermal demethylation of toluene in the presence of hydrogen. Hydrogen at the rate of $2.46 \times 10^6$ s.c.f./s.d., at a temperature of 100° F. and a pressure of 250 p.s.i.g., is introduced to heating zone 14 through line 11, and is passed upwardly through zone 14, contacting a downwardly moving bed of hot pebbles 13 and reducing their temperature to about 600° F. at which temperature they are continuously withdrawn through outlet 15 and raised by elevator 16 to the top of cooling zone 17 at the rate of 25 tons per hour. Toluene is introduced at the rate of 1050 b./s.d., at a temperature of 585° F. and pressure of 250 p.s.i.g. through line 12 to heating zone 14, where it mixes with the hydrogen feed and passes upwardly through zone 14, which is 10 feet in height and 2.5 feet in diameter. Pebble temperature at the top of zone 14 is 1250° F., and the pebbles are cooled by the stream of upflowing toluene and hydrogen, as they pass downward through zone 14, until the temperature is lowered to 730° F. at the toluene inlet point. From this point downward, as has been previously pointed out, they are further cooled by the hydrogen stream to a temperature of 600° F.

The toluene-hydrogen mixture, which has begun to interreact in the upper portion of bed 14, is disengaged from bed 14, and passes to reaction zone 19, which is 18 feet high and 6 feet in diameter. In reaction zone 19 the hydrogen and toluene continue to interreact to form benzene and methane, the heat of reaction raising the temperature of the product gases to 1365° at their exit from reaction zone 19. The product gases then flow upwardly through a bed of downwardly moving pebbles in cooling zone 17, where they are cooled to 645° F. prior to their exit through line 20. The product stream, withdrawn through line 20 at 235 p.s.i.g., comprises $0.9 \times 10^6$ s.c.f./s.d. methane, $1.8 \times 10^6$ s.c.f./s.d. hydrogen, 350 b./s.d. toluene, 515 b./s.d. benzene, and 65 b./s.d. of higher boiling reaction products. The products are then passed to conventional processing means for the separation of benzene as a product, and toluene for recycle to the process.

Pebbles at the bottom of the cooling zone 17 are heated by the hot product gases from the reactor 19 to a temperature of 1250° F., and are passed through standpipe 21 to the top of the pebble bed in heating zone 14, to replenish the supply of pebbles therein and to furnish heat to bring the hydrogen-toluene feed to reaction temperature.

In starting up my new process, the cooling zone, standpipe, and heating zone are filled with cold pebbles, and circulation of pebbles through the reactor is started. Valves 11a, 12a and 20a are closed. Hot flue gases, or other hot gases at a temperature sufficient to raise the pebbles to preheat temperature are then admitted to reaction zone 19 via line 40 under the control of valve 40a, and are passed upwardly through cooling zone 17, downwardly through heating zone 14, and out through lines 20 and 41, and lines 11 and 42. Circulation of pebbles is continued until the entire pebble mass has been brought to the temperature at which it is desired to take off the pebbles through line 15 when the process is on stream, for example, 600° F. when the process is toluene demethylation. Circulation of pebbles is then discontinued, and hot gases continue to be admitted to reaction zone 19 until the pebbles in the lower portion of cooling zone 17, the upper portion of heating zone 14, and in standpipe 21 have been brought to the desired temperature. Valves 41a and 42a may be controlled to meter the hot gases flowing through lines 41 and 42, a lesser amount of gas being passed through line 42 than line 41. In this manner a temperature gradient between lines 11 and 20 may be established which will closely approximate the temperature gradient under process operating conditions. Flow of hot gas through line 40 is then shut off, and an inert purging gas is introduced through lines 42 and 11 until all heating gas has been purged from the reactor, after which circulation of pebbles is resumed, valves 40a, 41a and 42a are closed, valves 11a, 12a, and 20a are opened, and the feed is introduced to the heating zone to place the process on stream. It will be understood, of course, that during the initial portion of any run the temperature of the feed may have to be adjusted by external heating means, until temperatures at various places in the reactor have been stabilized at the desired process conditions.

When, in the foregoing description, the term "pebbles" has been used, it will be understood by those skilled in the art that the term refers to free-flowing, particulate solids formed of ceramics or other material highly resistant to physical or thermal shock. Such particles may have a diameter of from 0.25 inch to 0.5 inch, or greater. Choice of the size to be used will depend largely on the rate of flow of the gaseous reactants and upon pressure-drop limitations imposed by the process conditions. Such particulate solids have heretofore found use as a heat transfer medium to supply heat to endothermic reactions, such as conversion of petroleum fractions, and are so well known to the art that further description is deemed unnecessary.

It will thus be observed that I have provided a novel pebble circulating system and process for conducting exothermic reactions at high temperatures in which a high degree of preheat may be imparted to the feed without the necessity for the employment of special materials of construction, in which the reaction products are quickly cooled to a temperature at which they are nonreactive, either with themselves or with materials with which they come in contact, and in which the exothermic heat of reaction is effectively conserved and returned to the process to furnish preheat for the feed.

While in the example emphasis has been placed on a process for the thermal demethylation of toluene to benzene, more highly alkylated benzenes, such as xylene, prehnitene, durene, and the like may be readily dealkylated under similar conditions, and my invention is applicable to the treatment of such feed stocks. Similarly, the process is adapted to the dealkylation of methyl naphthalenes, such as are found in the 425° F. to 500° F. fraction of cracked petroleum. In fact, it is particularly adapted to be used in processing this fraction, which contains a small proportion of saturated hydrocarbons, which crack at temperatures below demethylation temperatures, and form excessive coke deposits in the tubing in the furnace in which the feed is heated to reaction temperature, tending to plug up the tubes. By the use of the present process, any coke formed in the reaction is formed in the preheat section, is removed therefrom with the pebbles, and is burned in regenerator 31.

This application is a continuation-in-part of my co-pending application Serial Number 494,791, filed March 16, 1955, now abandoned.

The invention claimed is:

1. A process for effecting dealkylation of an alkylated aromatic which comprises passing a feed stock comprising an alkylated aromatic hydrocarbon and hydrogen in vapor phase to the lower portion of a preheat zone, flowing said feed stock upwardly through said preheat zone countercurrently to a first mass of downwardly moving heated pebbles contained within said preheat zone while absorbing sufficient heat therefrom to raise the temperature of the feed stock to a point at which the hydrogen and the alkylated aromatic hydrocarbon will exothermically interreact to form a dealkylated aromatic hydrocarbon, disengaging said feed stock from said first mass of pebbles and passing it to a reaction zone, reacting said feed stock in said reaction zone for a period of time sufficient to at least partially convert the alkylated aromatic hydrocarbon component of the feed to an aromatic hydrocarbon having at least one less alkyl group attached thereto than the alkyl aromatic hydrocarbon in the feed stock, passing the reaction products together with unconverted components of the feed to the lower portion of a cooling zone, flowing said unconverted feed components and reaction products upwardly countercurrently to a second downwardly moving mass of relatively cool pebbles contained within said cooling zone while imparting heat thereto in an amount sufficient to raise the temperature of the pebbles in the lower part of the cooling zone to a temperature approaching that of the reaction products, recovering substantially cooled unreacted feed components and reaction products from the upper portion of said cooling zone, continuously passing pebbles from the bottom of said first mass to the top of said second mass, and continuously passing pebbles from the bottom of said second mass to the top of said first mass, the heat required to raise the feed from the temperature at which it enters the preheat zone to reaction temperature being supplied by the heat given off by the exothermic reaction of alkyl aromatic hydrocarbon with hydrogen in the reaction zone.

2. The process according to claim 1 in which the alkylated aromatic is toluene and the reaction products comprise benzene and methane.

3. The process according to claim 2 in which the feed stock is heated, while in contact with said first mass of pebbles, to a temperature of from about 1150° F. to about 1300° F.

4. The process according to claim 3 in which the molar ratio of hydrogen to toluene in the feed is from about 1:1 to about 10:1.

References Cited in the file of this patent

UNITED STATES PATENTS

| | | |
|---|---|---|
| 2,645,606 | Hepp | July 14, 1953 |
| 2,684,390 | Bills | July 20, 1954 |
| 2,685,343 | Permann | Aug. 3, 1954 |